United States Patent [19]

Burgess

[11] Patent Number: 5,624,578
[45] Date of Patent: Apr. 29, 1997

[54] SEPARATION APPARATUS NOZZLE ASSEMBLY

[75] Inventor: George Burgess, Auckland, New Zealand

[73] Assignee: Andritz Sprout-Bauer, Inc., Muncy, Pa.

[21] Appl. No.: 557,118

[22] PCT Filed: May 2, 1995

[86] PCT No.: PCT/US95/05428

§ 371 Date: Dec. 12, 1995

§ 102(e) Date: Dec. 12, 1995

[87] PCT Pub. No.: WO95/29746

PCT Pub. Date: Nov. 9, 1995

[30] Foreign Application Priority Data

May 2, 1994 [NZ] New Zealand ............... 260432

[51] Int. Cl.$^6$ ..................................... B01D 33/11
[52] U.S. Cl. ............... 210/781; 210/784; 210/402; 210/403; 210/386; 209/270; 209/284; 239/225.1
[58] Field of Search ....................... 210/781, 784, 210/402, 403, 404, 386; 209/270, 284; 239/225.1

[56] References Cited

U.S. PATENT DOCUMENTS

| 4,426,289 | 1/1984 | Svehaug ................... 210/403 |
| 5,078,903 | 1/1992 | Burgess ................... 210/781 |
| 5,152,891 | 10/1992 | Netkowicz et al. ........... 210/403 |

*Primary Examiner*—David A. Reifsnyder
*Attorney, Agent, or Firm*—Chilton, Alix & Van Kirk

[57] ABSTRACT

A nozzle assembly (1) for use in a separation apparatus for separation of liquid suspensions the separation including such nozzle assembly, and a method for its use. In the nozzle assembly, the outlet end of the nozzle is biasable towards the inner surface of the rotatable screening drum (7) of the separation process, and a roller or pad is provided on the nozzle to contact the drum and maintain a substantially constant distance between the the nozzle outlet and the drum surface. The outlet end of the nozzle can be swivable relative to the feed means of the nozzle.

16 Claims, 5 Drawing Sheets

SEPARATION APPARATUS NOZZLE ASSEMBLY

This invention relates to improvements in and relating to a nozzle assembly for separation apparatus especially for use in separating of solids from liquids by screening.

The invention is intended for use in separation apparatus wherein a liquid suspension is introduced by feed means to the interior of a rotatable screening drum, and ejected onto or across the inner surface of the drum so that liquid passes through apertures in the drum while screened solids can be extracted from within the drum.

Up to the present time, various nozzle assemblies for use in separation apparatus have been available.

In such separation apparatus the nozzle assembly is generally set at a specific distance from the rotating inner wall of the screening drum in order that a substantially optimum pressure of flow of suspension onto or across the inner surface of the rotating drum may be achieved. The disadvantage of this system is that in order to maintain a substantially constant distance between the outlet end of the nozzle and the inner surface of the rotating drum, and thus a substantially constant pressure of flow, the drum must be a substantially perfect cylinder. Such drum construction suffers from a disadvantage of being complex and expensive.

It is thus the object of the present invention to provide a nozzle assembly for a separation apparatus such that a substantially constant and substantially optimum distance may be maintained between the discharge end of the nozzle and the surface of the rotating drum when the drum is not a perfect cylinder and/or to at least provide the public with a useful choice.

According to the present invention there is provided in a first aspect a nozzle assembly for ejecting a liquid suspension onto or across the inner surface of the rotatable screening drum of a separation apparatus having feed means to introduce the liquid suspension to said nozzle assembly, and characterised in that at least the outlet end of said nozzle assembly is biasable towards said inner surface of said drum, and wherein tracking means are provided on said nozzle assembly such that said tracking means contacts said inner surface of said drum when said outlet end is so biased, such that said tracking means maintains a substantially constant distance between said outlet end and said inner surface of said drum while said outlet end is so biased.

According to the present invention there is provided in a second aspect a method of ejecting a liquid suspension onto or across the inner surface of the rotatable screening drum of a separation apparatus at a substantially constant pressure, comprising:

(1) passing said liquid suspension through a nozzle assembly directed towards or across said inner surface;

(2) biasing at least the outlet end of said nozzle assembly towards said inner surface;

(3) providing tracking means between said outlet end and said inner surface of said drum such that a substantially constant distance is maintained between said outlet end and said inner surface of said drum.

This invention may also be said broadly to consist in the parts, elements and features referred to or indicated in the specification of the application individually, or collectively, and any or all combinations of any two or more of said parts, elements or features, and where specific integers are mentioned herein which have known equivalents in the art to which this invention relates, such known equivalents are deemed to be incorporated herein as if individually set forth.

Further aspects of this invention, which should be considered in all its novel aspects, will become apparent from the following description given by way of example of a possible embodiment thereof, and in which reference is made to the accompanying drawings wherein:

FIG. 1: Shows diagrammatically an elevational view of a nozzle assembly for a pressure-fed separation apparatus according to one possible embodiment of the invention.

FIG. 2: Shows diagrammatically a plan view of the nozzle assembly of FIG. 1.

FIG. 3: Shows diagrammatically a perspective view of the nozzle assembly of FIG. 1.

FIG. 4: Shows diagrammatically a plan view of a connector means forming part of the nozzle apparatus of FIG. 1.

FIG. 5: shows an elevational view of the connector means of FIG. 4.

FIG. 6: Shows diagrammatically a front view of the connector means of FIG. 4.

FIG. 7: Shows an elevational view of an alternative embodiment of the invention.

FIG. 8: Shows diagrammatically a plan view of an alternate embodiment of the nozzle assembly of FIG. 2.

It will be appreciated that the present invention is particularly suited for use with a pressure-fed separation apparatus where a substantially constant distance is required to be maintained between the interior surface of the rotatable screening drum and the outlet end of the nozzle assembly. However, it will be appreciated that the present invention has applications wherever a substantially constant and/or substantially minimum distance is required to be maintained between a nozzle and a rotating surface.

Referring firstly to FIG. 1, this shows diagrammatically an elevational view of a nozzle assembly for a pressure-fed separation apparatus according to one possible embodiment of the invention. The nozzle assembly referenced by (1) is shown consisting of a body (2) and a connector (3). The connector is shown screwed into a tap (4), the tap being connected to the manifold (5) of the pressure-fed separation apparatus. Also shown in FIG. 1 is the tracking means (6) attached to the outlet end of the body of the nozzle assembly and separating the outlet end of the body from the interior surface of a rotatable screening drum (7) forming part of the pressure-fed separation apparatus.

The outlet end of the body (2) of the nozzle assembly (1) is represented in FIG. 1 in two positions relative to the surface of the drum, in order to demonstrate the effect of the swivel means (8) in allowing the outlet end of the nozzle assembly to track the inner surface of the rotating drum (7) when the outlet end is biased towards the drum (7).

Figure 1:
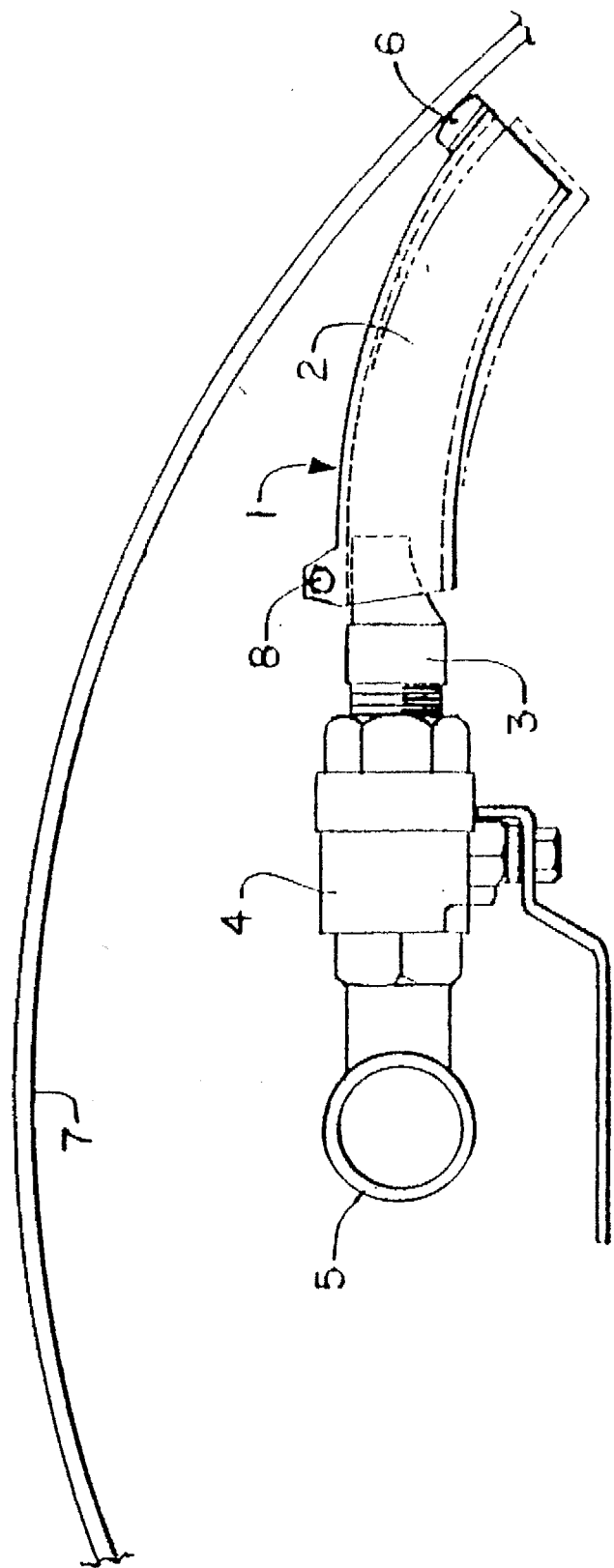
Figure 2:
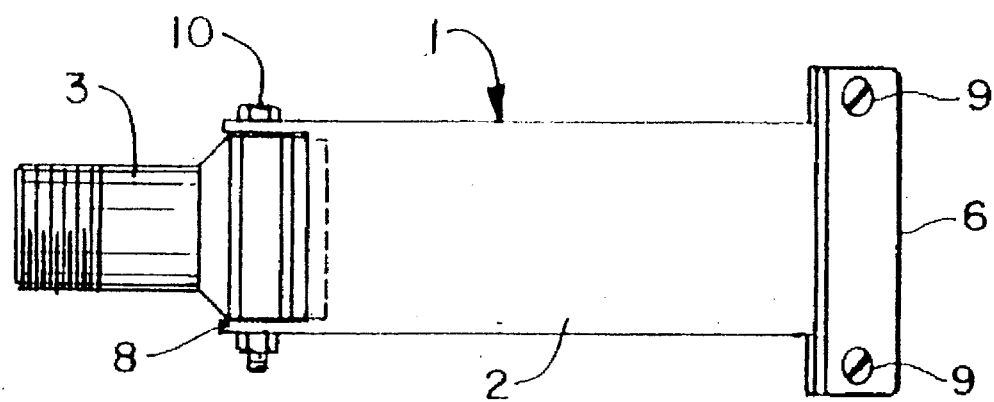
FIG. 2 shows diagrammatically a plan view of the nozzle assembly according to one possible embodiment of the invention for a pressure-fed separation apparatus showing the tracking means (6) attached to the outlet end of the body (2) by way of screws (9) and the body (2) connected to the connector (3) by way of swivel means (8) and bolt (10).
Figure 3:
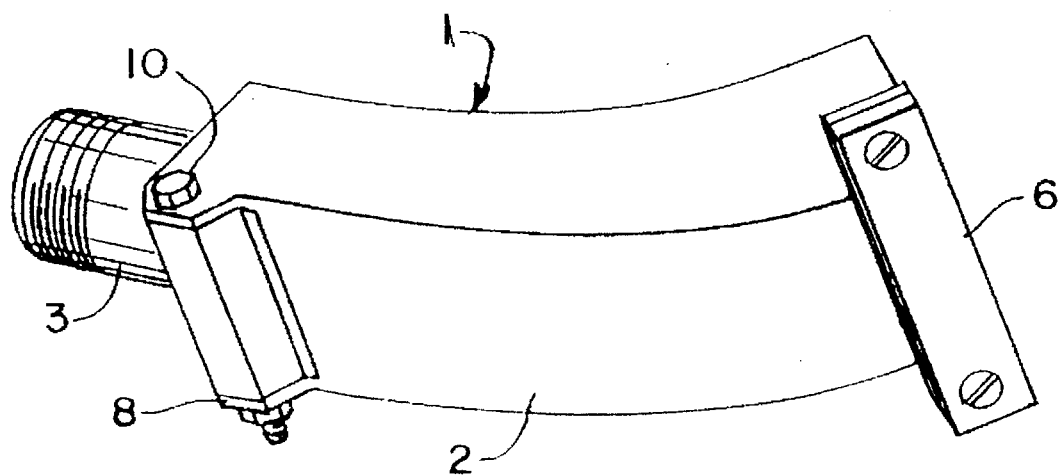
FIG. 3 shows diagrammatically a perspective view of the nozzle assembly (1) for a pressure-fed separation apparatus according to one possible embodiment of the invention showing the tracking means (6), the swivel means (8) and the bolt (10) by which the body (2) and the connector (3) are connected together.
Figure 4:
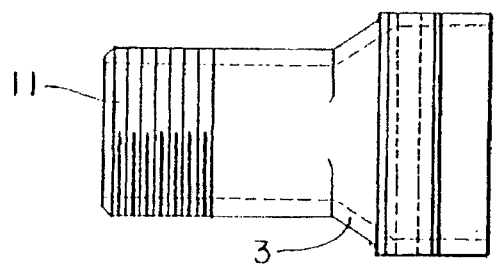
FIG. 4 shows diagrammatically a plan view of the connector (3) for a pressure-fed separation apparatus according to one possible embodiment of the invention showing the end (11) of the connector threaded to allow connection to the pressure-fed separation apparatus tap.
Figure 5:
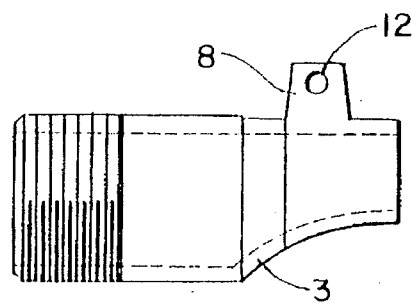
FIG. 5 shows an elevational view of the connector of the nozzle assembly for a pressure-fed separation apparatus according to one possible embodiment of the invention showing the connector (3) and swivel means (8) perforated by a hole (12) thereby allowing the connector to be connected to the body means by way of a bolt.
Figure 6:
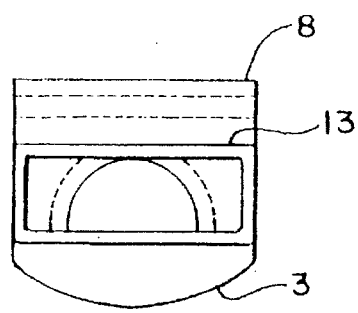
FIG. 6 shows diagrammatically a front view of the connector (3) of the nozzle assembly for a pressure-fed separation apparatus according to one possible embodiment of the invention showing the swivel means (8) of the connector, the circular inlet of the connector (11) and the rectangular outlet (13) of the connector.
Figure 7:
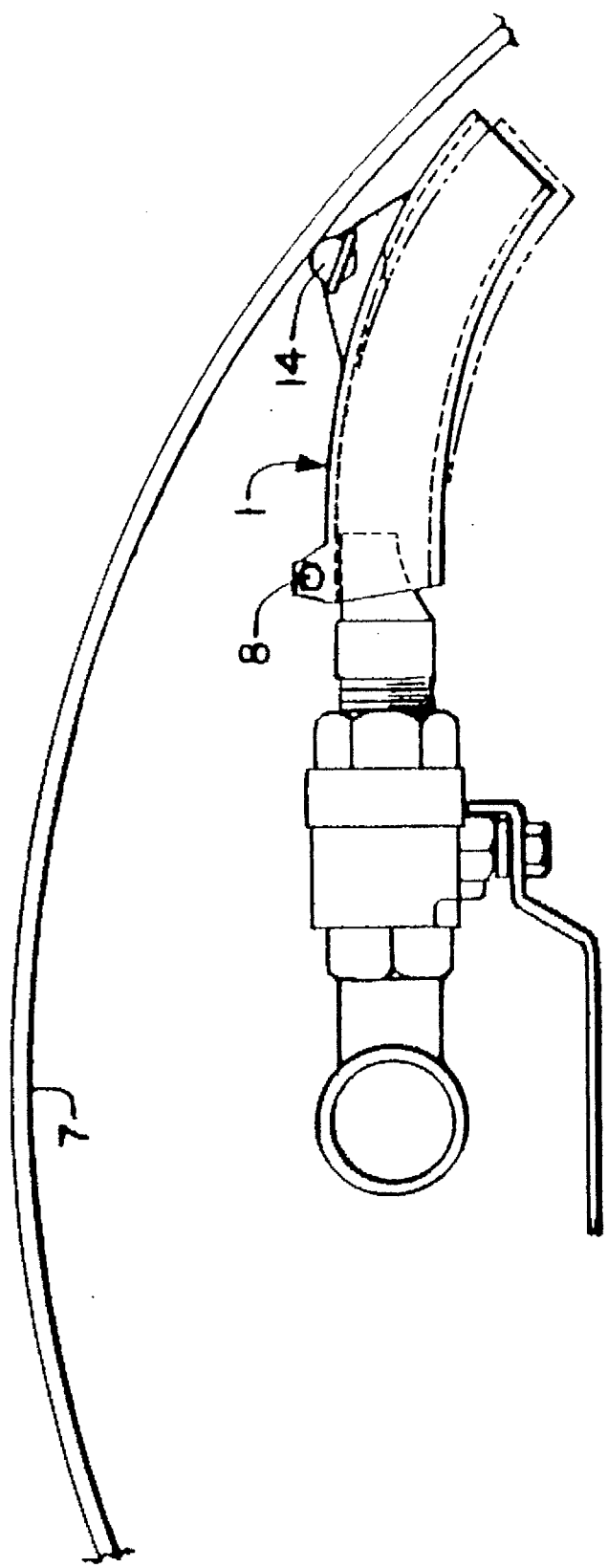
Figure 8:
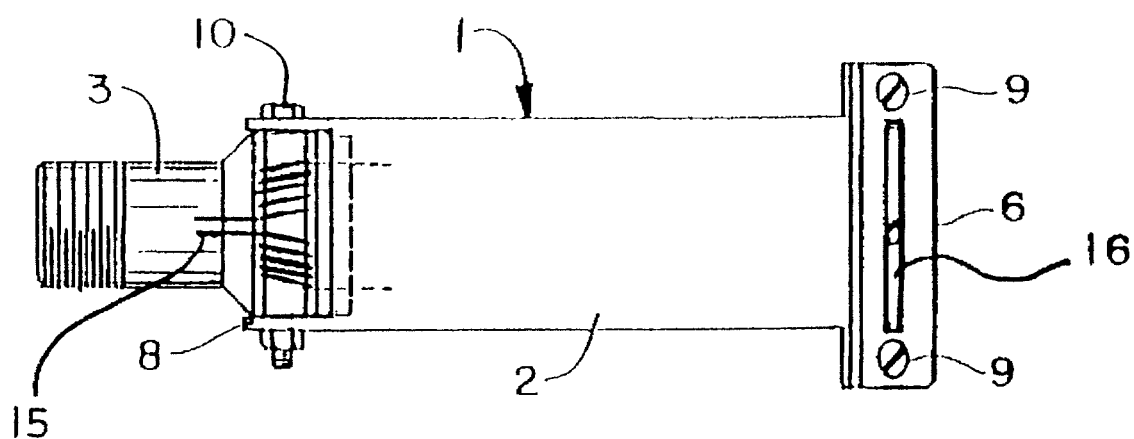

FIG. 7 shows diagrammatically an elevation view of a nozzle assembly for a pressure-fed separation apparatus according to an alternative embodiment of the invention in which the tracking means consists of a roller (14). Again, the outlet end and tracking means are shown in two positions, demonstrating the effect of the swivel means (8) in allowing the outlet end of the nozzle assembly to track the inner surface of the rotating drum (7) when the outlet end is biased towards the drum.

In use according to the invention the nozzle assembly is designed to eject a liquid suspension onto or across the inner surface of a rotatable screening drum of a separation apparatus, in particular a pressure-fed separation apparatus. The liquid suspension is fed to the nozzle assembly by feed means.

According to the invention, the outlet end of the nozzle assembly is biasable towards the inner surface of the drum. In the preferred embodiment, the nozzle assembly includes swivel means located between the feed means which introduces the liquid suspension to the nozzle assembly, and the outlet end of the nozzle assembly, so that the outlet end is able to swivel relative to the feed means.

As least the outlet end of the nozzle assembly is thus able to be biased against or towards the inner surface of the screening drum.

The biasing may be achieved in use by the passage of the liquid suspension through the nozzle assembly under pressure.

Alternatively, biasing means such as mechanical biasing means for example a spring (15), may be provided, to bias the outlet end of the nozzle assembly towards the inner surface of the screening drum.

When the nozzle assembly outlet end is thus biased towards the screening drum, the tracking means, which may for example be a pad or a roller as illustrated in the figures, contacts the inner surface of the rotating drum, between the surface and the outlet end. As the drum rotates, the outlet end thus remains spaced at a substantially constant and optimal distance from the inner surface determined by the tracking means. Irregularities of the inner surface are tracked by the tracking means, so that the distance is maintained.

Thus the angle and pressure of the ejection of the liquid suspension at or across the screening drum is maintained at a substantially constant level.

The tracking means may be used in a contra-flow or pro-flow system. The tracking means may be lubricated by liquid or gas, the liquid or gaseous supply means (16) being arranged between the tracking means and the surface of the drum, or arising from the exterior of the rotating drum or by way of supply through the contact surface of the tracking means.

The illustrations show the use of the present invention in a pressure-fed separation apparatus wherein the nozzle is ranged at a particular angle in relation to the screening drum. However, the present invention could also be adapted for use with any liquid supply system where it is desirable that a substantially constant or optimal distance be maintained between the nozzle and the surface on to which the liquid is to be ejected.

The particular embodiment of the invention shown is made of a number of discrete parts, but a integral nozzle assembly could also be constructed of suitable materials.

It is thus seen that the present invention provides a simple yet effective nozzle assembly for use in separation apparatus.

What I claim is:

1. A nozzle assembly for ejecting a liquid suspension onto or across a inner surface of a rotatable screening drum of a separation apparatus having feed means to introduce the liquid suspension to said nozzle assembly, said nozzle assembly having an outlet end, the improvement comprising that at least said outlet end of said nozzle assembly is biasable towards said inner surface of said drum, and wherein tracking means are provided on said nozzle assembly such that said tracking means contacts said inner surface of said drum when said outlet end is so biased, whereby said tracking means maintains a substantially constant distance between said outlet end and said inner surface of said drum while said outlet end is so biased.

2. A nozzle assembly according to claim 1 wherein said nozzle assembly comprises swivel means located between said feed means and said outlet end whereby said outlet end is able to swivel relative to said feed means.

3. A nozzle assembly according to claim 1 wherein said tracking means comprises a pad.

4. A nozzle assembly according to claim 1 wherein said tracking means comprises a roller.

5. A nozzle assembly according to claim 1 wherein the passage of liquid suspension through said nozzle assembly biases said outlet end towards said inner surface of said drum.

6. A nozzle assembly according to claim 1 further comprising biasing means for biasing said outlet end towards said inner surface of said drum.

7. A nozzle assembly according to claim 6 wherein said biasing means comprises at least one spring.

8. A nozzle assembly according to claim 1 wherein said tracking means contacts said inner surface of said drum at a point of contact, said nozzle assembly further comprising supply means for supplying a lubricant to said point of contact.

9. A separation apparatus for separating a suspension into solids and liquids comprising:

screening means comprising a rotatable drum, said drum having an inner surface; and nozzle means disposed in said screening means for ejecting the suspension onto or across said inner surface of said drum, said nozzle means comprising an outlet end and tracking means, said outlet end being biasable towards said inner surface of said drum wherein said tracking means contacts said inner surface of said drum, whereby said tracking means maintains a substantially constant distance between said outlet end and said inner surface of said drum while said outlet end is so biased.

10. The separation apparatus of claim 9 wherein said nozzle means further comprises:

feed means for supplying said nozzle means with a flow of the suspension; and swivel means disposed between said feed means and said outlet end whereby said outlet end is swivelable relative to said feed means.

11. The separation apparatus of claim 10 wherein said flow of said suspension through said nozzle means biases said outlet end towards said inner surface of said drum.

12. The separation apparatus of claim 9 further comprising biasing means for biasing said outlet end towards said inner surface of said drum.

13. The separation apparatus of claim 12 wherein said biasing means comprises at least one spring.

14. The separation apparatus of claim 9 wherein said tracking means comprises a pad.

15. The separation apparatus of claim 9 wherein said tracking means comprises a roller.

16. A method of ejecting a liquid suspension onto or across the inner surface of a rotatable screening drum of a separation apparatus at a substantially constant pressure, comprising:
 (1) passing said liquid suspension through a nozzle assembly directed towards or across said inner surface, said nozzle assembly having an outlet end;
 (2) biasing at least the outlet end of said nozzle assembly towards said inner surface;
 (3) maintaining a substantially constant distance between said outlet end and said inner surface of said drum with tracking means disposed between said outlet end and said inner surface.

* * * * *